(12) United States Patent
Mathy, Jr. et al.

(10) Patent No.: US 8,647,103 B2
(45) Date of Patent: Feb. 11, 2014

(54) MODULAR CLAMP STATION WITH VARIABLE PITCH

(75) Inventors: John M. Mathy, Jr., Stewartstown, PA (US); David N. Fiorani, Jacobus, PA (US)

(73) Assignee: Graham Engineering Corporation, York, PA (US)

( * ) Notice: Subject to any disclaimer, the term of this patent is extended or adjusted under 35 U.S.C. 154(b) by 73 days.

(21) Appl. No.: 13/476,621

(22) Filed: May 21, 2012

(65) Prior Publication Data

US 2012/0228790 A1    Sep. 13, 2012

Related U.S. Application Data

(63) Continuation-in-part of application No. 12/898,824, filed on Oct. 6, 2010, now Pat. No. 8,454,342.

(51) Int. Cl.
*B29C 49/36*        (2006.01)
*B29C 49/42*        (2006.01)

(52) U.S. Cl.
USPC ........... 425/182; 425/540; 425/541; 29/401.1

(58) Field of Classification Search
USPC ................. 425/182, 195, 540, 541; 29/401.1; 264/39
See application file for complete search history.

(56) References Cited

U.S. PATENT DOCUMENTS

| | | |
|---|---|---|
| 3,764,250 A | 10/1973 | Waterloo |
| 4,213,750 A | 7/1980 | Kubota et al. |
| 4,421,472 A | 12/1983 | Martin, Jr. |
| 4,801,260 A | 1/1989 | Oles et al. |
| 5,261,809 A | 11/1993 | Koga |
| 5,551,862 A | 9/1996 | Allred, Jr. |
| 5,681,596 A | 10/1997 | Mills et al. |
| 5,948,346 A | 9/1999 | Mills et al. |
| 6,113,841 A | 9/2000 | Nielsen |
| 6,345,973 B1 | 2/2002 | Nielsen |
| 6,386,857 B1 | 5/2002 | Nava |
| 6,709,261 B2 | 3/2004 | Cargile et al. |
| 6,749,419 B2 | 6/2004 | Nightingale et al. |
| 6,773,251 B2 * | 8/2004 | Nightingale ................. 425/182 |
| 7,140,870 B2 | 11/2006 | Nava |
| 7,611,657 B2 | 11/2009 | Klinedinst et al. |
| 2012/0086156 A1 | 4/2012 | Mathy, Jr. et al. |

FOREIGN PATENT DOCUMENTS

| | | |
|---|---|---|
| JP | S50 62265 A | 5/1975 |
| JP | S57 49536 A | 3/1982 |
| JP | 2004299129 A | 10/2004 |
| WO | 03/106141 A1 | 12/2003 |
| WO | 2004/007176 A1 | 1/2004 |

\* cited by examiner

*Primary Examiner* — Robert B Davis
(74) *Attorney, Agent, or Firm* — McNees Wallace & Nurick LLC

(57) ABSTRACT

A method and modular mold clamp assembly for use in a molding machine. The assembly has a frame with a base member. The base member has end members provided thereon. Radial adjustment mechanisms are mounted on the end members, with the radial adjustment members configured to cooperate with turntables of the molding machine. At least one support bracket extends from the frame. The support bracket is configured to cooperate with at least one support fixture of the molding machine. The radial adjustment mechanisms and the at least one support bracket allow the modular mold clamp assembly to be moved toward and away from the center of a wheel of the molding machine.

20 Claims, 9 Drawing Sheets

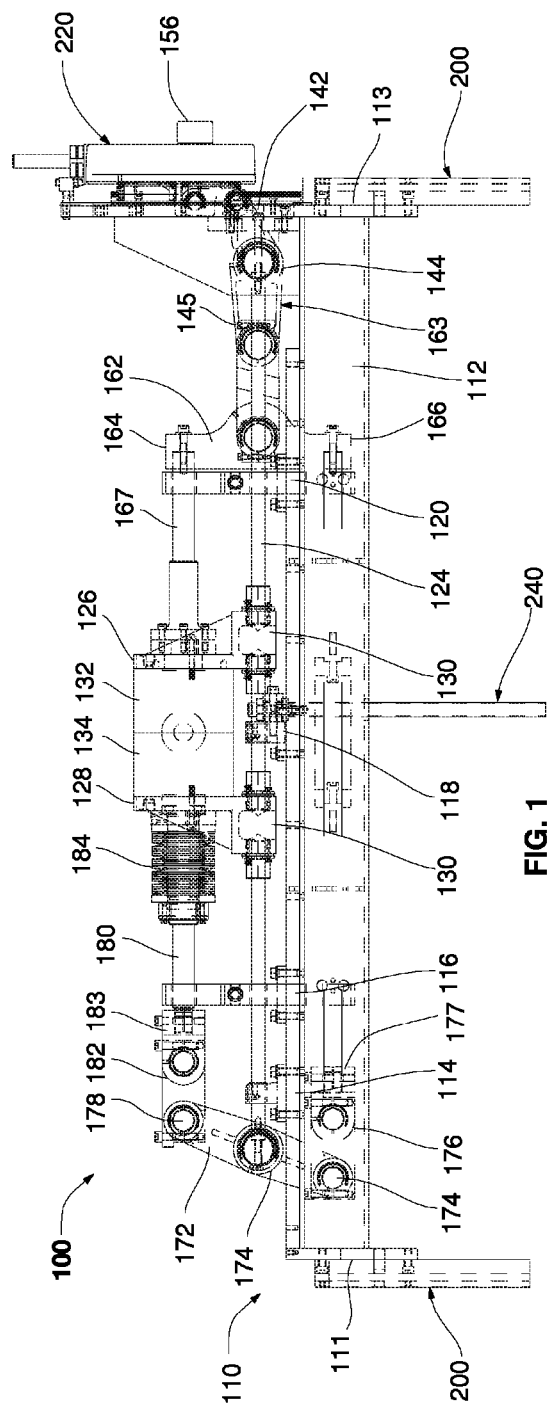
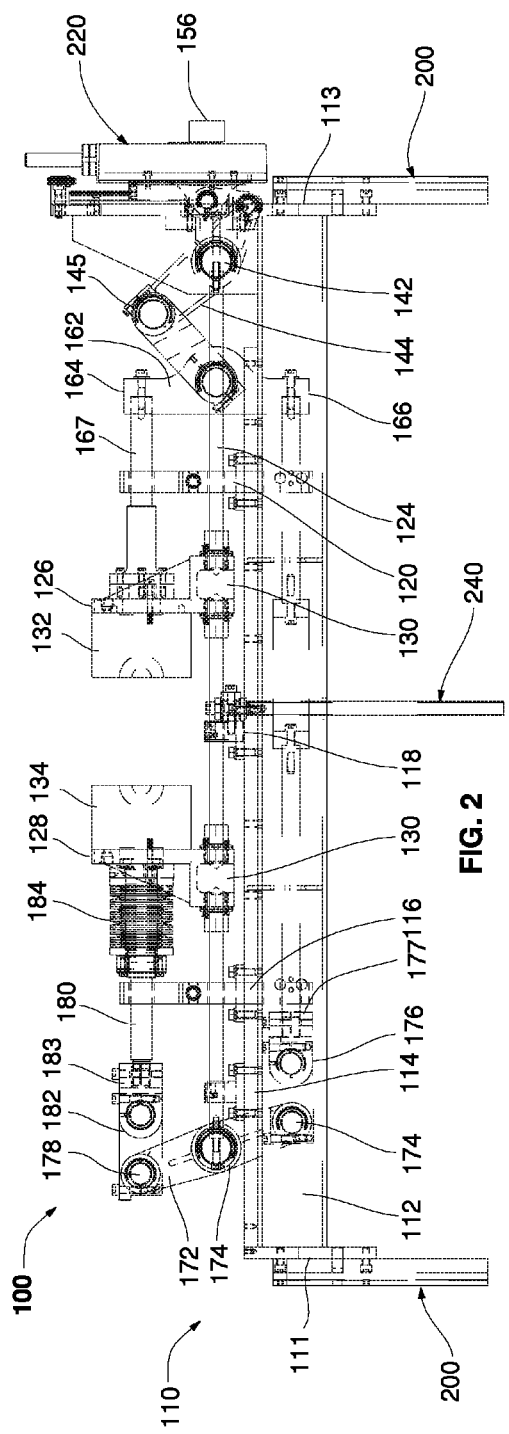

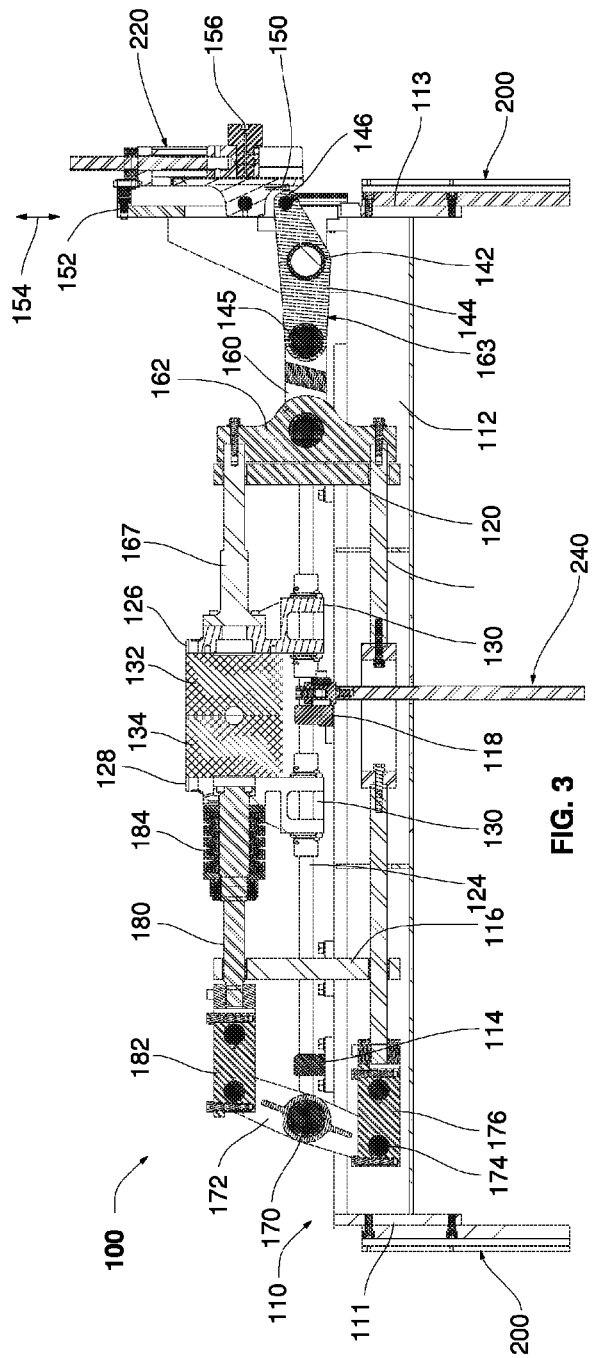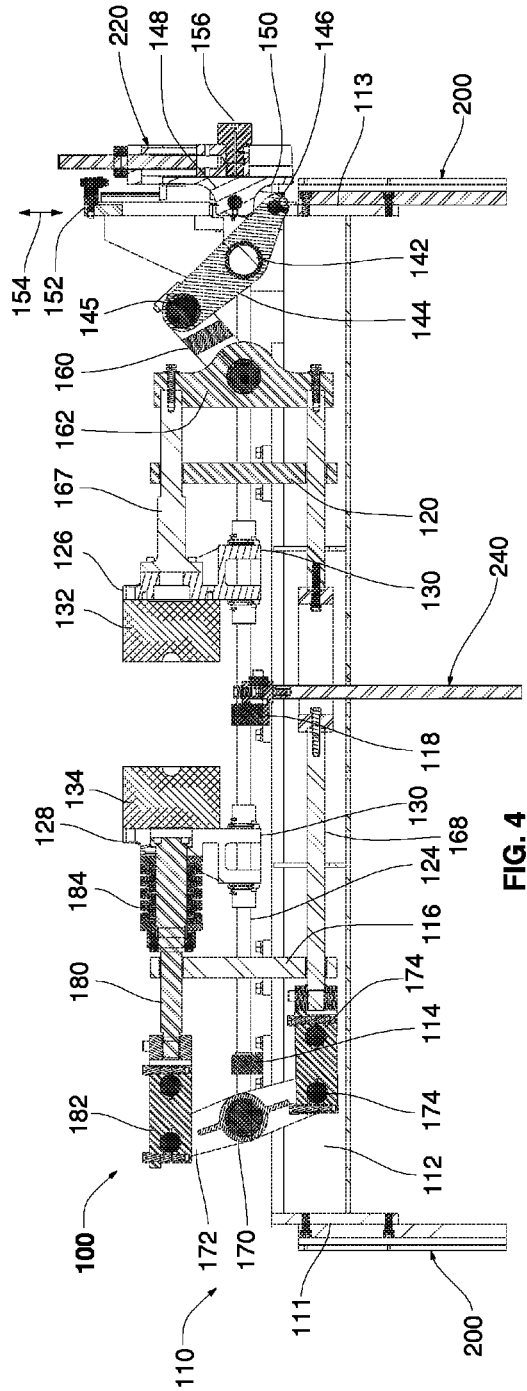

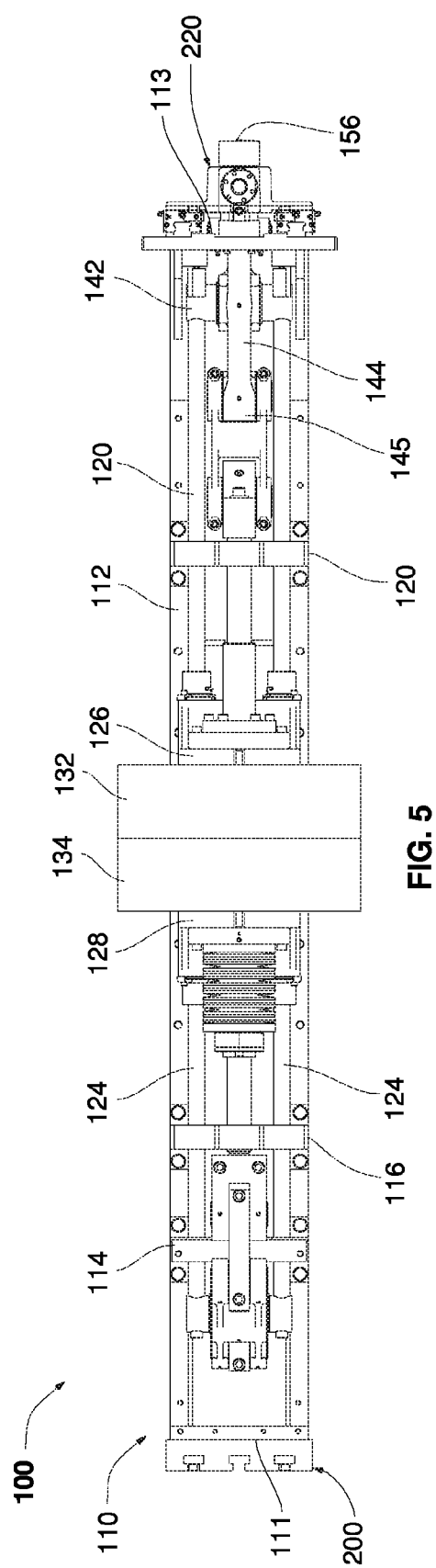
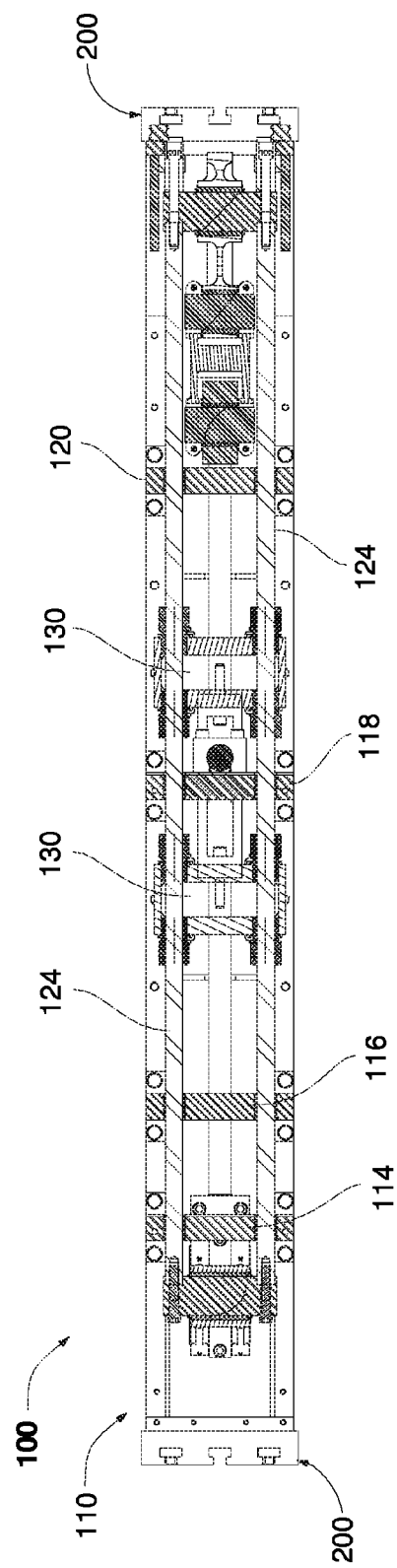
FIG. 5
FIG. 6

MODULAR CLAMP STATION WITH VARIABLE PITCH

CROSS-REFERENCES TO RELATED APPLICATIONS

This application is a Continuation-in-Part application under 35 U.S.C. §121 of U.S. patent application Ser. No. 12/898,824 filed Oct. 2, 2010 and now U.S. Pat. No. 8,454,342, which is hereby incorporated by reference in its entirety.

FIELD OF THE INVENTION

The invention relates generally to an extrusion molding apparatus. Specifically, the present invention relates to modular mold clamping assemblies with a variable pitch for use with the molding apparatus.

BACKGROUND OF THE INVENTION

Conventional rotary extrusion blow molding apparatuses typically have a structural frame mounted on a rotating shaft. The structural frame has a plurality of molds mounted thereon and is known in the industry as a wheel. As the wheel is rotated, the plurality of molds is rotated past an extrusion die extruding a continuous parison. Each mold typically includes two mold halves, each comprising a mold cavity half therein, such that when the mold halves are closed, the mold defines a mold cavity corresponding to the configuration of the article to be molded, such as a container. Each mold, seriatim, is rotated past the extrusion die with the mold halves in an open configuration. The mold halves of each mold are then closed around the parison to enclose the parison within the mold defined by the mold halves. A blowing needle is then inserted into the parison within the closed mold and internal pressure is introduced to the parison, forcing it to inflate and conform to the configuration of the mold cavity. The molded object is then cooled and the mold opened to release the molded object from the mold.

When the two mold halves are clamped over one or more parisons prior to blowing of the parisons to form plastic containers, high clamp forces are required to close the mold halves on the parisons to pinch off the plastic and to hold the mold halves closed during blow molding. Conventional mold clamp assemblies are mounted on the frame of the machine supporting the assembly and, when actuated, transmit clamping force from a drive on one side of the mold to the other side of the mold through the frame. This means that the frame supporting the molds must be sufficiently strong to counteract bending moments imposed by the high clamp force transmitted through the frame. Deformation of the frame by the clamp force is undesirable because deformation would not permit the mold faces to close parallel with one another.

The blow molding apparatuses described above are typically costly, heavy machines, which require a good deal of expertise to adjust and maintain. For example, when a mold clamp requires maintenance, the entire wheel must be taken off-line as the mold clamp is worked on. In addition, if the number of mold clamps of the blow molding apparatus is to be changed to accommodate molds of a different size, the cost and time required to disassemble and reassemble the apparatus is significant.

In an attempt to improve upon existing technology, U.S. Pat. No. 7,611,657 discloses a mold clamp assembly for a rotary-type or shuttle-type blow molding machine. The clamp assembly is mounted on a frame and includes a mold opening and closing drive connected to the two mold halves independently of the frame, so that when the mold halves are closed, clamp forces are not transmitted to the mold halves through the frame. Consequently, the high clamp force required to hold the mold halves together during blow molding is not transmitted from one side of the mold to the other side of the mold through the machine frame.

Accordingly, there is a need for an improved molding apparatus and mold clamp assembly which allows for ease of maintenance and ease of configuration of the apparatus. There is also a need to reduce the complexity of the molding apparatus to help reduce the cost of the manufacture and operation of the molding apparatus. In addition, there is a need to have a modular mold clamp assembly for accomplishing the above, in which the modular mold clamps have a variable pitch or are radially adjustable to allow the mold circle formed of the respective molds in the mold clamps to be made larger or smaller to accommodate molds of different sizes to minimize scrap material associated with the molding process.

SUMMARY OF THE INVENTION

An object of the invention is to provide a rotary wheel in which the positioning of the modular mold clamp assemblies and the molds provided therein can be radially adjusted to accommodate molds of different sizes, thereby minimizing the scrap generated when molding containers.

Another object of the invention is to provide a mechanism to allow for the radial adjustment which requires minimal downtime for the rotary molding wheel, thereby minimizing the impact to the productivity of the operation.

Another object of the invention is to provide a radial adjustment which can be adjusted by maintenance level personnel rather than factory technicians, thereby minimizing the cost.

Another object of the invention is to provide a simplified structure of a rotary molding wheel by using a modular mold clamp assembly which provides the structural support necessary between components of the rotary molding wheel, thereby allowing for the simplified radial adjustment of the modular mold clamp.

Another object of the invention is to provide a modular mold clamp assembly in which the bending moments are not transferred to the radial adjustment mechanism or the components of a rotary molding wheel.

Another object of the invention is to provide a radial adjustment mechanism which can be mounted to the modular mold clamp assembly and to the rotary molding wheel, allowing the rotary molding wheel to be configured to specific needs.

One aspect of the invention is directed to a modular mold clamp assembly for use in a molding machine. The assembly has a frame with a base member. The base member has end members provided thereon. Radial adjustment mechanisms are mounted on the end members, with the radial adjustment members configured to cooperate with turntables of the molding machine. At least one support bracket extends from the frame. The support bracket is configured to cooperate with at least one support fixture of the molding machine. The radial adjustment mechanisms and the at least one support bracket allow the modular mold clamp assembly to be moved toward and away from the center of a wheel of the molding machine.

Another aspect of the invention is directed to a rotary molding machine. The rotary molding machine has a pair of turntables rotatably mounted on respective shafts or a common shaft. A plurality of modular mold clamp assemblies is mounted on and spaced around the turntable, with each modular mold clamp assembly including a frame having a base member, a first end member and an opposed second end member. The first and second end members are integrally attached to the base member. Radial adjustment mechanisms are mounted on the first and second end members, the radial adjustment members cooperate with turntables. At least one support bracket extends from each modular mold clamp assembly, with the at least one support bracket cooperating with at least one support fixture of the rotary molding machine.

Another aspect of the invention is directed to a method of adjusting a modular mold clamp assembly mounted on a rotary molding machine. The method comprising: loosening mounting members to allow the mounting members to move relative to slots of a radial adjustment mechanisms attached to the modular mold clamp assembly; engaging a first adjustment mechanism of a support bracket of the modular mold clamp to move the support bracket and the modular mold clamp assembly to a desired position relative to the a support fixture of the rotary molding machine and a shaft of the rotary molding machine; and tightening the mounting members to prevent unwanted movement of the mounting members relative to the slots, thereby maintaining the modular mold clamp assembly in position relative to the rotary molding machine.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a side view of a first embodiment of a modular mold clamp assembly for a rotary-type blow molding machine, the modular mold clamp assembly having molds inserted therein and being shown in the closed position.

FIG. 2 is a side view of a first embodiment of the modular mold clamp assembly for a rotary-type blow molding machine, the modular mold clamp assembly having molds inserted therein and being shown in the open position.

FIG. 3 is a cross-sectional view of the modular mold clamp assembly of FIG. 1, taken along the longitudinal axis of the modular mold clamp assembly.

FIG. 4 is a cross-sectional view of the modular mold clamp assembly of FIG. 2, taken along the longitudinal axis of the modular mold clamp assembly.

FIG. 5 is a top view of the modular mold clamp assembly of FIG. 1.

FIG. 6 is a cross-sectional view through a tie rod centerline of the modular mold clamp assembly of FIG. 1.

DETAILED DESCRIPTION OF THE INVENTION

Figure 9:
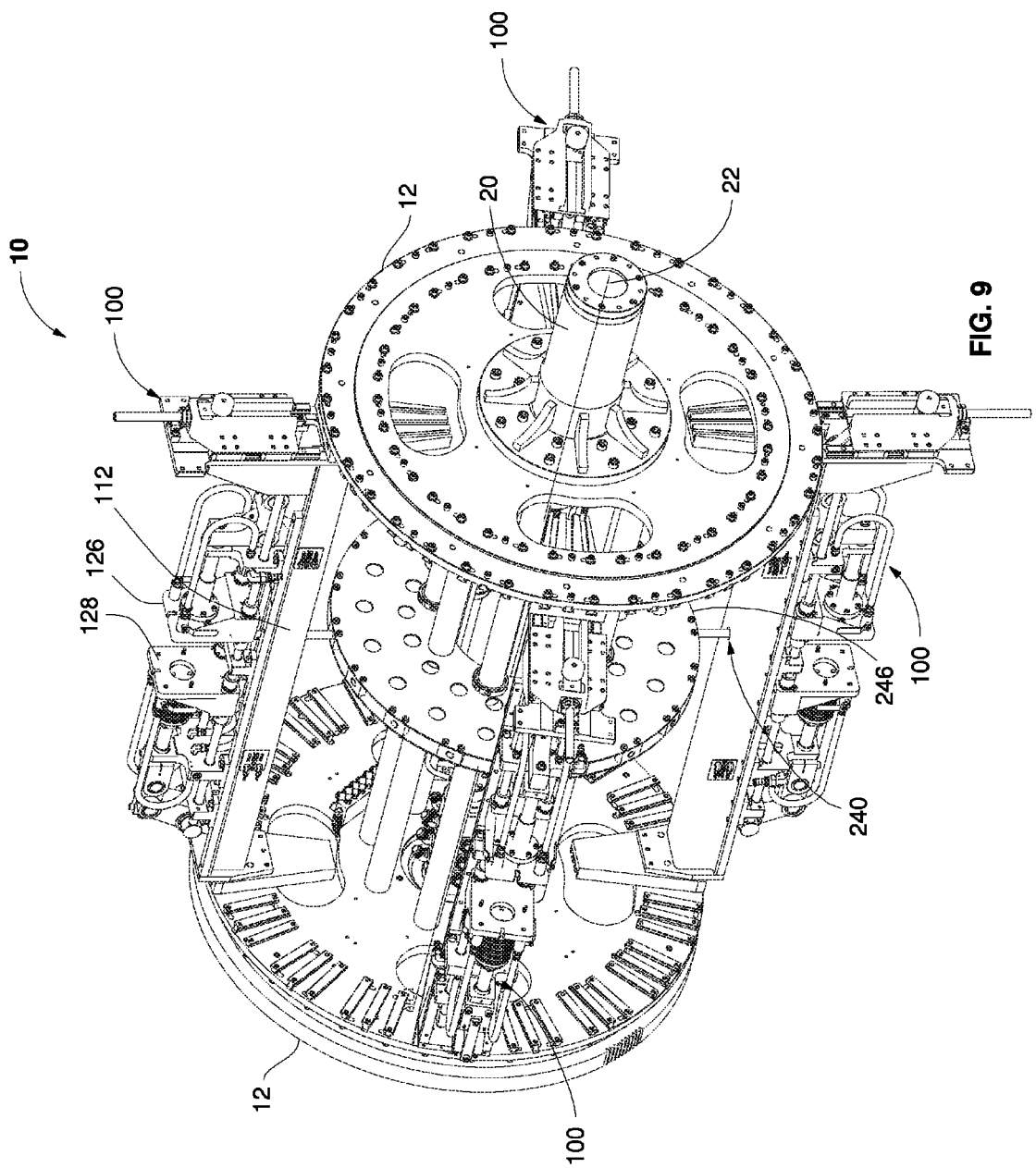
FIG. 9 is a perspective view of a wheel of a blow molding apparatus with several modular mold clamp assemblies attached thereto, the mold clamp assemblies being shown with no molds positioned therein.
Figure 10:
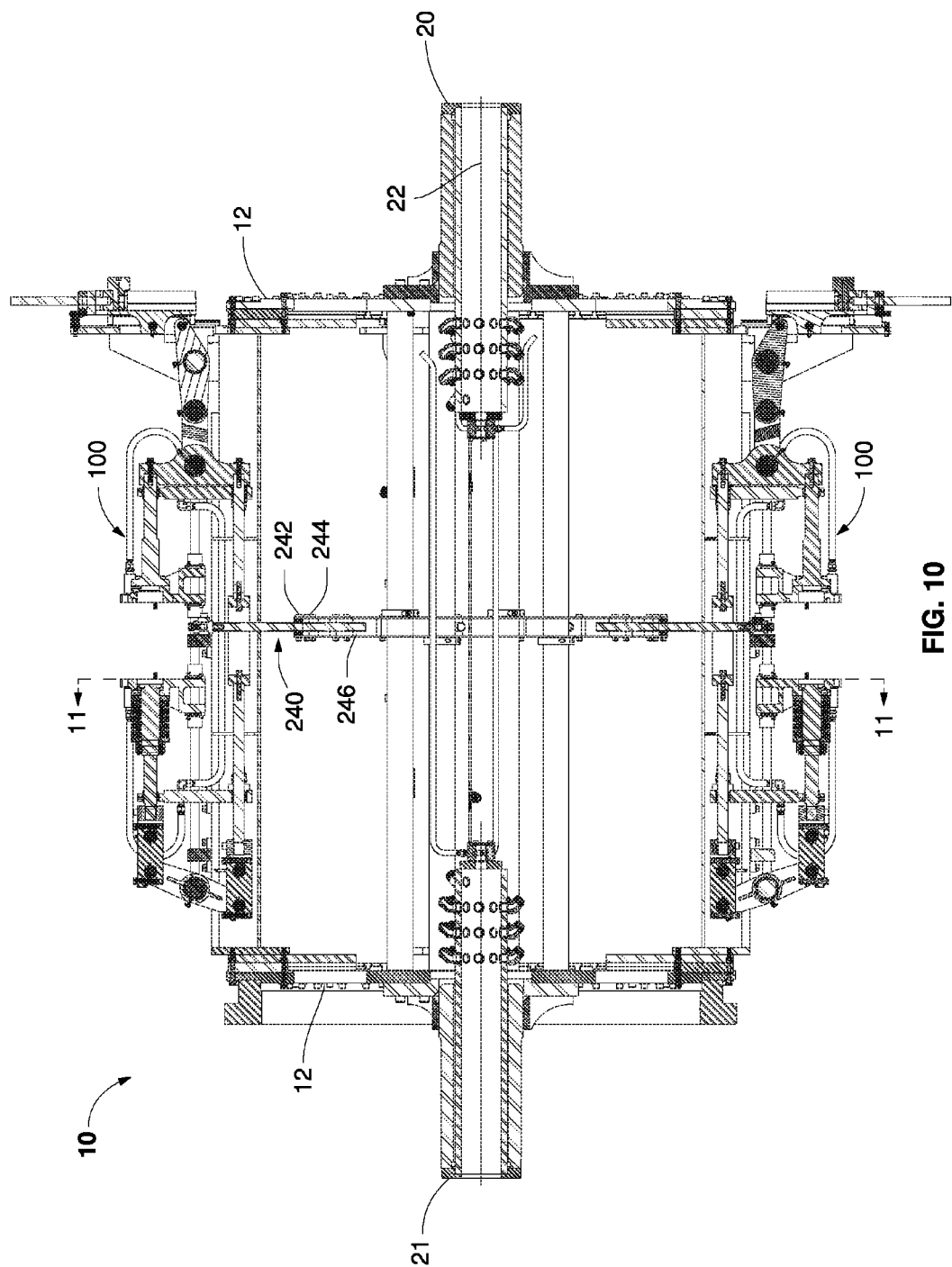
FIG. 10 is a cross-sectional view of the wheel, taken along the plane of the longitudinal axis of the wheel.
Figure 11:
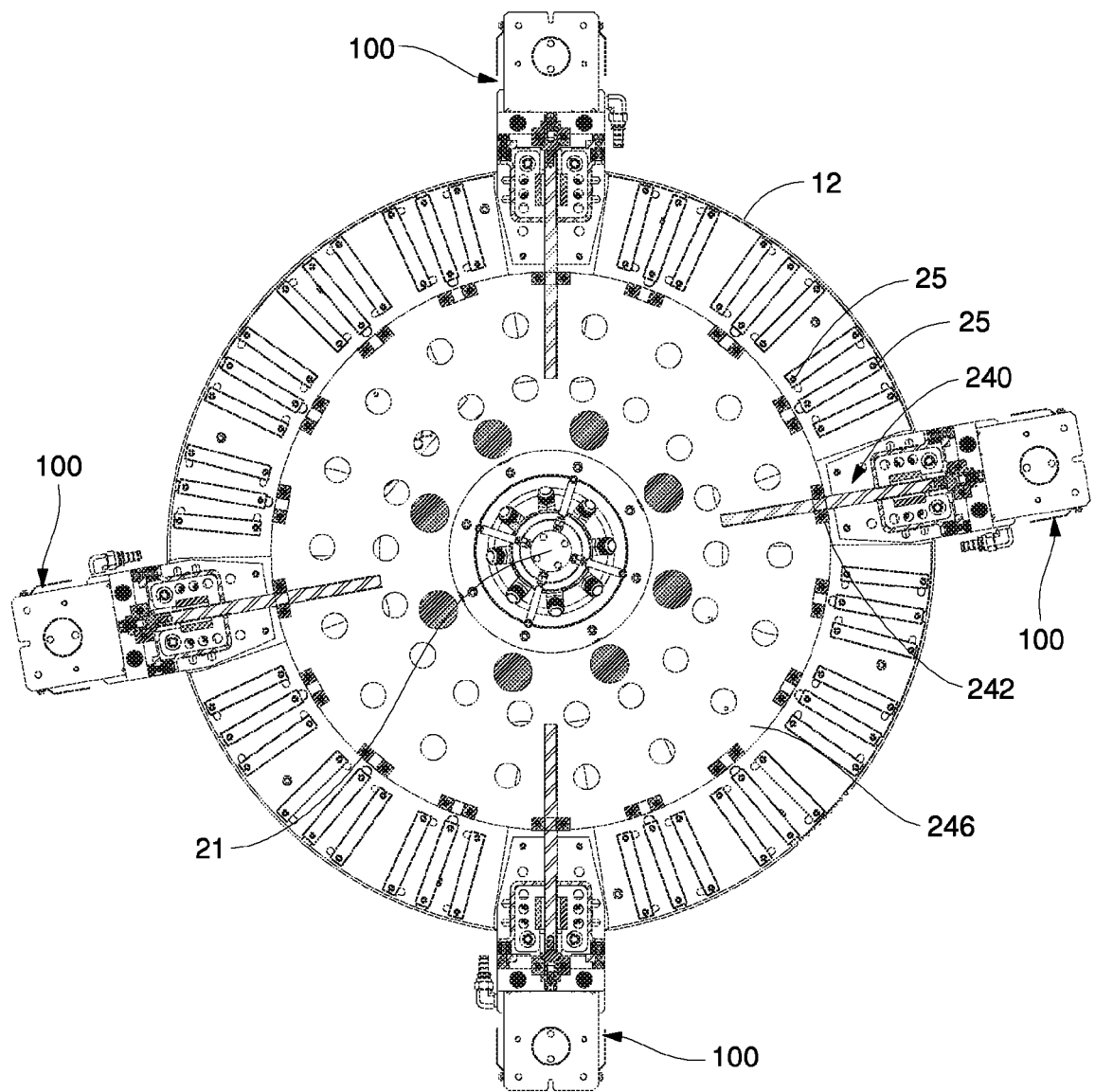
FIG. 11 is a cross-sectional view of the wheel, taken along the line 11-11 of FIG. 9.

Referring to FIGS. 9-11, a wheel 10 of a blow molding machine is illustrated. However, the invention is not limited to a blow molding machine, as other molding machines can be used without departing from the scope of the invention. The blow molding machine has a base (not shown) upon which the wheel 10 is rotatably supported. An extruder (not shown) is positioned adjacent the wheel 10. The wheel 10 has two essentially parallel radially extending plates or turntables 12 which carry a plurality of modular mold clamp assemblies 100, each having an inner cavity (not depicted) to receive a parison from the extruder. The wheel 10 is mounted on shafts 20, 21 which have a drive which rotates the wheel 10 and modular mold clamp assemblies 100 about a rotational axis or center 22 of the wheel 10 and the shafts 20, 21 to direct each mold secured by the modular mold clamp assemblies 100 between extrusion, blow molding, cooling and ejection stations, as is known in the art. In the depicted embodiment, the wheel 10 is configured to have eighteen modular mold clamp assemblies mounted thereon, of which four are shown. However, each wheel 10 can be configured to allow any number of modular mold clamp assemblies 100 to be secured thereto.

Referring to FIGS. 1-8, an exemplary embodiment of mold clamp assembly 100 is shown, the modular mold clamp assembly 100 having a frame 110. The frame 110 has a base member 112 and two oppositely-facing end members 111, 113. The end members 111, 113 extend from either end of the base member 112 in a direction that is essentially transverse to the longitudinal axis of the base member 112. The end members 111, 113 are integrally to the base member 112 in any known manner which has the strength characteristics required. Mounting openings 115 are provided on the frame 110 proximate the ends of the base member 112. The openings 115 cooperate with mounting hardware to mount the modular mold clamp assembly 100 to radial adjustment mechanisms 200 which are in turn mounted to mounting openings 25 of the turntables 12 of the wheel 10, as will be more fully described below. The base member 112, end members 111, 113 and radial adjustment mechanisms 200 are made from any material that has the strength characteristics required to support the components of the modular mold clamp assembly 100 and to provide the structural integrity required to support the radially extending turntables 12 of the wheel 10.

Figure 7:
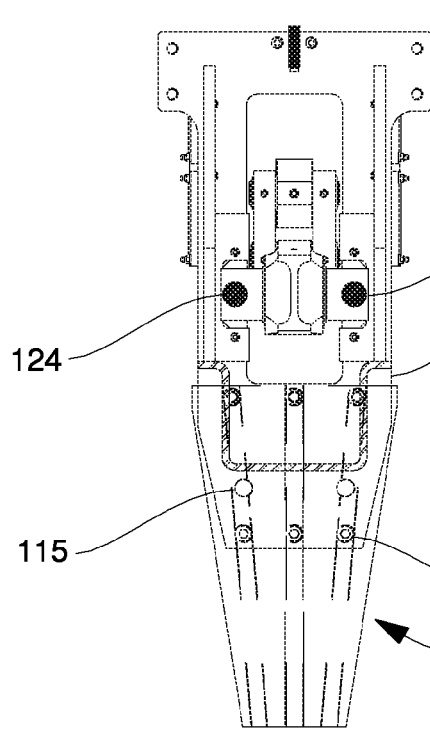
FIG. 7 is a first end view of the modular mold clamp assembly of FIG. 1.
Figure 8:
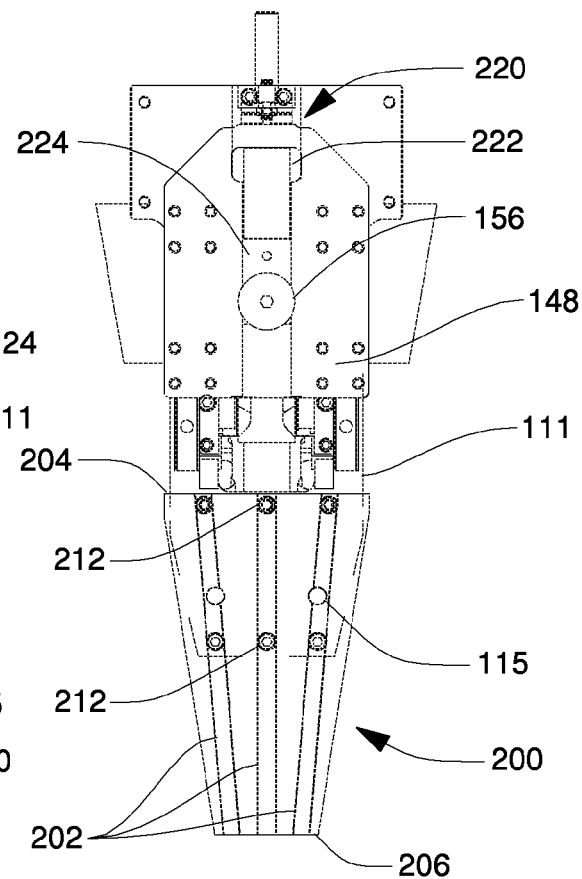
FIG. 8 is a second end view of the modular mold clamp assembly of FIG. 1.
Figure 13:
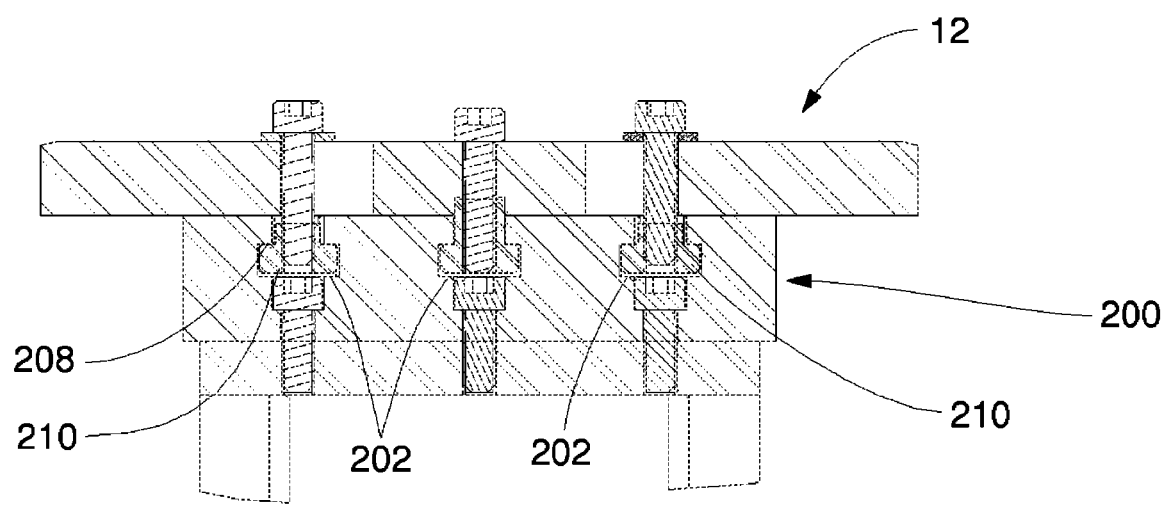
FIG. 13 is a cross-sectional view taken through a radial adjustment mechanism mounted to the turntable.

As best shown in FIG. 8, the radial adjustment mechanism 200 has mounting slots 202 which extend from proximate a first surface 204 of the mechanism 200 to proximate a second surface 206. In the exemplary embodiment shown, three slots 202 are shown which extend from the first surface 204 to the second surface 206. The longitudinal axis of the slots 202 are positioned closer to each other at proximate the second surface 206, thereby allowing the radial adjustment mechanism 200 to be mounted on the circular turntables 12. As best shown in FIG. 13, each slot 202 has a T-shaped configuration with shoulders 208 which cooperate with a mounting member 210 to maintain the radial adjustment mechanism in position relative to the turntables 12. Referring again to FIG. 8, mounting openings 212 extend through the radial adjustment mechanism 200. The mounting openings 212 are configured to cooperate with the mounting hardware which is inserted into mounting openings 115 of the modular clamp assembly 100 to maintain the radial adjustment mechanism 200 in position relative to the modular clamp assembly 100.

In the exemplary embodiment shown, the center slot is dimensioned to have tight tolerances to allow the center slot to precisely align with the mounting member 210 to proper align the radial adjustment mechanism 200 on the turntable 12. The center slot also cooperates with the mounting member 210 to secure the radial adjustment mechanism 200 to the turntable 12. In the exemplary embodiment, the outer slots are not machined with as much precision. Therefore, the outer slots are used to secure the radial adjustment mechanism 200 to the turntable 12 and are not used to align the radial adjustment mechanism 200 on the turntable 12. However, other configurations may be used without departing from the scope of the invention.

Figure 12:
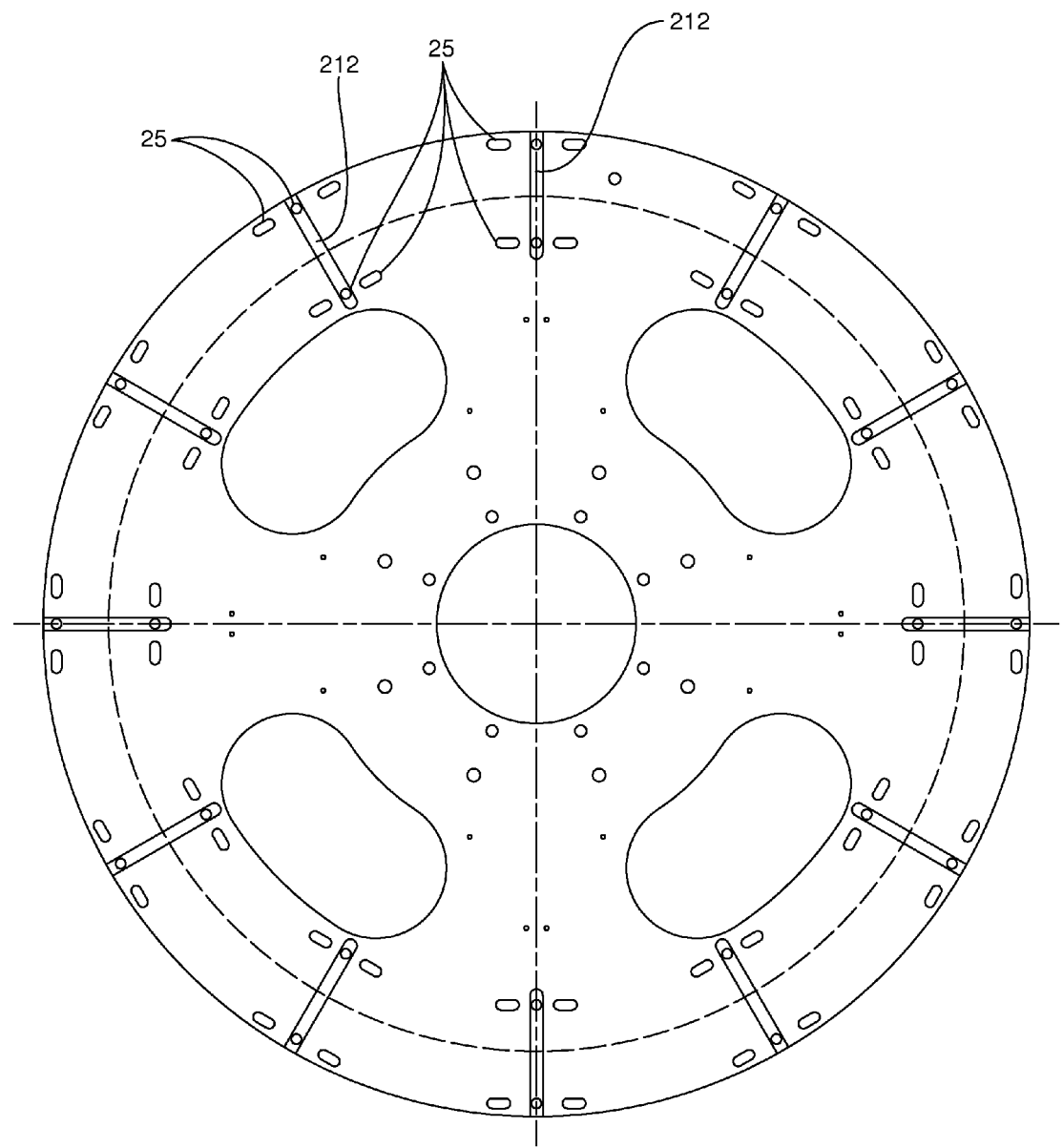
FIG. 12 is an end view of a turntable of the wheel.

In the exemplary embodiment, each mounting member 210 has a T-shaped configuration that is configured to cooperate and slide within a respective T-shaped slot 202. As shown in FIG. 13, the heads of the Ts of the mounting members 210 cooperate with the shoulders of the shoulders 208 of the slots 202 to maintain the mounting members 210 in the slots 202. Mounting hardware is provided to extend from the mounting members 210 to through the mounting openings 25 of the turntables 12 to secure the mounting members 210 and the radial adjustment mechanism 200 to the turntables 12. However, other types of mounting members may be provided without departing from the scope of the invention. In the exemplary embodiment, a keyway 212 (FIG. 12) is provided proximate the center mounting openings of the turntables 12. The keyway 212 cooperates with a respective mounting member 210 to align the mounting member 210 and the radial adjustment mechanism 200 and to prevent movement of the radial adjustment mechanism 200 transverse to the longitudinal axis of the keyway 212.

As described above, the center slot is dimensioned to have tight tolerances to allow the center slot to precisely align with the mounting member 210 to proper align the radial adjustment mechanism 200 on the turntable 12. The center mounting openings 25 are therefore also machined with precision to maintain the radial adjustment mechanism 200 in proper position. Also as previously stated, the outer slots are not machined with as much precision. Therefore, the outer mounting openings 25 may be machined with less precision as the outer mounting openings 25 are used to secure the radial adjustment mechanism 200 to the turntable 12 and are not used to align the radial adjustment mechanism 200 on the turntable 12. However, other configurations may be used without departing from the scope of the invention.

Each modular mold clamp assembly 100 includes rods 124 mounted on base member 112 of frame 110. The rods 124 extend essentially parallel to the longitudinal axis of the base member 112. As best shown in FIGS. 1 and 4, rods 124 extend through openings in mounting brackets 114, 116, 118, 120. In the embodiment shown, the mounting brackets 114, 116, 118, 120 are fixed to the base member 112 by bolts or other mounting hardware. Mold platens 126 and 128 are mounted on the rods 124 by slides 130 which permit movement of the platens toward and away from each other during closing and opening of mold halves 132 and 134 mounted on platens 126 and 128 respectively. FIG. 1 illustrates assembly 100 with the mold halves closed.

Pin 142 extends through a portion of end member 113. The adjacent ends of rods 124 are secured to the pin. Pivot arm 144 is rotatably mounted on pin 142 between the rods 124. The outer end 146 of arm 144 away from the mold halves extends through an opening in end member 113 and is connected to slide car 148 by links 150. The slide car 148 is mounted on the outside surface of the end wall 113 by slide 152 to permit movement of the car back and forth in the direction of arrow 154 shown in FIGS. 3 and 4. A radial adjustment or cam follower mounting device 220 is mounted on slide car 148. The cam follower mounting device 220 has a slot 222 provide thereon which carriers a cam mounting block 224 having a cam follower roller 156 mounted thereon. The cam follower roller 156 extends into circumferential fixed cam slot (not shown) of the blow molding machine. Rotation of wheel 10 moves follower 156 into and around the cam slot to slide car 148 inwardly and outwardly and rotate arm 144 between the positions shown in FIGS. 1 and 2.

In the exemplary embodiment shown, the slot 222 is machined to allow the cam mounting block 224 to freely move along the longitudinal axis of the slot 222, while preventing movement of the cam mounting block 224 transverse to the longitudinal axis of the slot 222. The cam mounting block 224 has a T-shaped configuration that is configured to cooperate and slide within the T-shaped slot 222. However, other configurations may be used without departing from the scope of the invention.

Shift member 162 is located between mold platen 126 and end member 113. A cylindrical rod 167 extends from an upper end 164 of member 162 and is bolted directly to mold platen 126 so that movement of member 162 toward end member 113 moves the mold platen 126 and mold half 132 toward the end member 113. The lower end 166 of shift member 162 extends from the lower end of bracket 120 and extends below mold halves 132 and 134. The shift member is slidably mounted on rods 124 and 168.

Link 160 is pivotally connected to the inner link end 145 of arm 144 and to mold shift member 162. The pivot connection between link 160 and member 162 is located halfway between the upper end 164 and lower end 166 of member 162 to balance forces. Shift rod 168 is parallel to the longitudinal axis of the base member 112 and extends freely through the base member 112. The shift rod 168 is connected to the lower end 166 of member 162. The link 160 and inner link end 145 of arm 144 form a two-link extendable and retractable drive 163 for opening and closing platens 126, 128 and mold halves 132, 134.

Cross pin 170 is fixedly mounted on the ends of rods 124 extending past platen 128 and mold half 134 and rotatably supports pivot arm 172. The lower end 174 of arm 172 is connected to the adjacent end of shift rod 168 by pivot link 176 and rod end clevis 177. The upper end 178 of arm 172 is connected to mold clamp rod 180 by pivot link 182 and rod end clevis 183. Clamp rod 180 is connected to platen 128 through dished washer spring pack 184. Rod 168, clevis 177, link 176, arm 172 and rod 180 are part of a mold shift mechanism for opening and closing platen 128 and mold half 134. Mold shift mechanism is connected to drive 163 through member 162.

Referring to FIGS. 9 and 10, a support rod 240 extends through base 112 and is retained by a bracket that is attached to the mounting bracket 118. The bracket allows the support rod 240 to rotate yet captures the support rod 240 so that as the support rod 240 is rotated, the modular mold clamp assembly 100 moves radially. The support rod 240 extends from f the base 112 in a direction away from mold platens 126, 128. In the exemplary embodiment, the support rod 240 is positioned proximate the center of gravity of the modular mold clamp assembly 100, such that approximately ½ the weight of the modular mold clamp assembly 100 is distributed on either side of the support rod 240, although other embodiments with one or more support members may be used without departing from the scope of the invention. The support rod 240 has a first adjustment mechanism 242, such as, but not limited to, threads which cooperate with a second adjustment mechanism 244, such as, but not limited to, a nut or the like on a support fixture 246 which extends from the blow molding machine. The cooperation of the first adjustment mechanism 242 and the second adjustment mechanism 244 allow the modular clamp assembly 100 to be adjusted radially as required, as will be more fully described. In the exemplary embodiment shown, the support fixture 246 is a center disk which has openings to receive the support rods 240 therein. However, other fixtures can be used without departing from the scope of the invention.

In operation, the modular mold clamp assemblies 100 are assembled to the turntable 12 of the wheel 10, as previously described. Water management hoses are attached to a water-connection member of each assembly 100. The water is supplied to cool the mold, as is known in the industry. Air hoses are attached to an air-connection member of each assembly 100. The air is used to blow air into the mold cavities and to operate the required devices to facilitate the removal of the container from the cavity, both of which are known in the industry.

With the mold halves 132 and 134 in the open position and drive 163 retracted as shown in FIG. 2, rotation of wheel 10 moves the open mold halves 132, 134 past the extrusion station to either side of a number of parisons extruded from an extrusion head. Rotation of the wheel 10 also moves follower 156 along a radially outward portion of a cam slot to slide car 148 radially outwardly from the position of FIG. 2 to the position of FIG. 1. This movement rotates arm 144 counter-clockwise from the position of FIG. 2 to the position of FIG. 1.

Rotation of arm 144 from the position of FIG. 2 to the position of FIG. 1 extends drive 163 to move shift member 162 away from end member 113. Movement of the shift member moves mold half 132 from the open position to the closed position. Movement of the shift member also actuates mold shift mechanism to move shift rod 168 away from end member 113, rotate arm 172 and move mold half 134 from the open position to the closed position. The connection between rod 180 and spring pack 184 is adjusted so that spring pack 184 is compressed when the mold is closed.

During and after closing of the mold, the clamp force exerted on mold half 134 is transmitted directly to drive 163 through mold shift mechanism. An equal and oppositely-directed clamp force exerted on mold half 132 is transmitted to the drive directly through member 162. Clamping forces are transmitted through rods 124 between cross pins 170 and fixed pin 142 which in turn is attached to end frame 113 which is in turn mounted to radial adjustment mechanism 200. Clamping forces are not transmitted through frame member 110. As a result, the frame 110 is not subjected to bending moments by the high clamp forces holding mold halves 132 and 134 closed. The frame 110, and therefore, the radial adjustment mechanisms 200, need not be strengthened against bending moments. Smaller, more efficient motors may be used to operate the machine due to weight reduction.

After closing of the mold to capture the parison, rotation of wheel 10 moves the closed mold halves away from the extrusion station to a blow station where the parisons are blown, and, after cooling of the blown parisons, to an ejection station where the mold is opened for ejection of blow-molded containers. During rotation to the ejection station, follower 156 is moved radially inwardly by the cam track so that arm end 146 is moved radially inwardly, about fixed pin 142, drive 163 is retracted as shown in FIG. 2, and the platens 126, 128 and mold halves 132, 134 are opened by movement of the shift member 162 and mold shift mechanism. Platen 126 and mold half 132 are connected directly to shift member 162 and are opened in response to movement of the member. Platen 128 and mold half 134 are opened by movement of shift rod 168 toward side member 113, which corresponds to rotation of arm 172 and movement of rod 180 away from side member 113 and toward side member 111.

During the operation of the wheel 10, it is not uncommon to have problems with a particular mold clamp assembly. It is also common to have scheduled maintenance. In the current state of the art, in order to repair or perform maintenance on a particular mold clamp assembly, the operation of the wheel is stopped and the repair or maintenance is performed on the mold clamp assembly as the assembly is still attached to the wheel. This can cause significant downtime for the entire operation and dramatically affects the productivity of the operation. Alternatively, the operation of the wheel is stopped and the mold clamp assembly is removed from the plates and shafts of the wheel and replaced with another mold clamp assembly. However, as the mold clamp assemblies are attached at numerous points to the structure of the wheel, this process takes a good deal of time and expertise to accomplish, thereby dramatically affecting the productivity of the operation and requiring the services of a skilled operator to accomplish the transfer.

In contrast, the modular mold clamp assembly 100 described herein overcomes the problems associated with the prior art. As all of the components of the modular mold clamp assembly 100 are mounted to the frame 110, the removal of the self-contained modular mold clamp assembly 100 from the wheel 10 is greatly facilitated. In order to repair or perform maintenance on a particular mold clamp assembly 100, the operation of the wheel 10 is stopped and the modular mold clamp assembly 100 is removed and replaced with another modular mold clamp assembly 100. As all of the components are attached to the frame 100, rather than to structural members of the wheel 10, the maintenance personnel simply unscrews the hardware which attaches the radial adjustment mechanisms 200 of the frame 110 of the modular mold clamp assembly 100 to the wheel 10, and loosens the support rod 240 from the support fixture 246. The modular mold clamp assembly 100 is then removed and a new modular mold clamp assembly 100 is inserted. The radial adjustment mechanisms 200 of the frame 110 of the new modular clamp assembly 100 are mounted to the wheel 10 by use of the hardware. The support bracket of the new modular clamp assembly 100 is also inserted into the support fixture 246. This allows the repair or maintenance to be accomplished with minimal downtime for the wheel, thereby minimizing the impact to the productivity of the operation. Additionally, the replacement of the modular mold clamp assembly 100 can be accomplished with maintenance level personnel rather than factory technicians, thereby minimizing the cost.

The use of the modular mold clamp assemblies 100 also allows the structure of the wheel 10 to be simplified. As each modular member assembly 100 is self-contained, the various components of the modular mold clamp assembly 100 are not mounted to shafts or plates which extend between the turntables 12 of the wheel 10. In addition, the base member 112, the end members 111, 113 and the radial adjustment mechanisms 200 are made of materials that have the structural strength and integrity to act as supports when installed in the wheel 10. Therefore, the wheel 10 used with the modular mold clamp assemblies 100 described herein is greatly simplified from the wheels currently in use. The shafts and plates previously required are eliminated, as the modular mold clamp assemblies 100 provide the structural support necessary between the turntables 12 of the wheel 10. This allows the wheel 10 of the blow molding machine to have more open spaces, making any repair to the blow molding machine easier. The use of the modular mold clamp assemblies 100 as supports also reduces the overall cost of the blow molding machine, as it is less expensive to have structural modular mold clamp assemblies than to have structural shafts and plates.

While the base member 112, end members 111, 113 and radial adjustment mechanisms 200 must be made of material which has sufficient strength characteristics to support the components and provide the structural integrity required for the wheel 10, the frame 110 does not need to made of material which can withstand the bending moments exerted by the high clamp forces holding molds 132 and 134 closed, as the bending moments are not transferred to the frame 110, as was previously described. Therefore, the frame 110 need not be strengthened against bending moments, thereby allowing the frame 110 to be made of relatively lightweight material. This facilitates the removal and replacement of the modular mold clamp assembly 100 and reduces the material costs to manufacture the frame 110.

In the prior art, different sized containers manufactured using the blow molding machine require that different wheels be used, as the redial positioning of the mold stations to accommodate the different mold sizes required turntables, etc. of different sizes. Consequently, as each wheel is designed for a particular mold size, the inventory associated with meeting the needs of applications can be extensive or the amount of waste generated by the wheels is significant when smaller molds are used in the wheels, as much material is wasted between the molds.

In contrast, according to the present invention, the positioning of the modular mold clamp assembly may be easily adjusted to be moved closer to or away from the shafts 20, 21 or the center of the wheel 10. In other words, the diameter of the mold circle, which is comprised of all of the modular mold clamp assemblies may be made larger or smaller depending upon the size of the containers to be manufactured and the size of the mold halves 132, 134. In order to move each modular mold clamp assembly, the mounting members 210 are loosened to allow the radial adjustment mechanisms 200 to move relative to the mounting members 210. The first adjustment mechanism 242 is then engaged to move the support rod 240 and the modular mold clamp assembly 100 to the desired position relative to the support fixture 246 and the turntables 12. For example, turning the first adjustment mechanism 242 in one direction causes the modular mold clamp assembly 100 to be moved away from the center of the wheel, while turning the first adjustment mechanism 242 in the opposite direction causes the modular mold clamp assembly 100 to be moved toward the center of the wheel. Once properly adjusted, the mounting members 210 are tightened to prevent unwanted movement of the mounting members 210 relative to the slots, thereby maintaining the modular mold clamp assembly 100 in position relative to the turntables 12 and the wheel 10. Gauges or the like may be used to monitor and accurately control the movement of the modular mold clamp assemblies and control the positioning thereof relative to the turntables 12. This allows the modular mold clamp assemblies to be accurately moved toward or away from the center of the wheel and maintained in position. In so doing, the space between adjacent the modular mold clamp assemblies and their respective molds is minimized, thereby minimizing the amount of the material which is wasted between molds, thereby reducing the amount of scrap generated.

According to the invention described herein, the inventory required to accommodate various configurations is minimized. As the wheels do not require shafts, etc., the wheels can be manufactured to accommodate different configurations. The support fixtures 246 and the open spaces of the wheel 10 and the radial adjustment mechanisms 200 and the support rods 240 of the modular mold clamp assemblies 100 allow the modular mold clamp assemblies to be moved to accommodate different container sizes, thereby allowing the same modular mold clamp assemblies 100 to be moved to accommodate molds of different sizes, thereby reducing the need to manufacture specific mold clamp assemblies or specific turntables 12 for specific machines.

While the particular embodiment shown represents a two-ton modular clamp assembly, other sizes of modular clamp assemblies are included within the scope of the invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A modular mold clamp assembly for use in a molding machine, the assembly comprising:
   a frame having a base member, the base member having end members provided thereon;
   radial adjustment mechanisms mounted on the end members, the radial adjustment members configured to cooperate with turntables of the molding machine;
   at least one support bracket extending from the frame, the support bracket configured to cooperate with at least one support fixture of the molding machine;
   wherein the radial adjustment mechanisms and the at least one support bracket allow the modular mold clamp assembly to be moved toward and away from the center of a wheel of the molding machine.

2. The modular mold clamp assembly as recited in claim 1, wherein a cam follower is movably mounted on a respective end member, the cam follower is coupled to a drive linkage of the modular mold clamp assembly, whereby the movement of the cam follower moves the drive linkage.

3. The modular mold clamp assembly as recited in claim 1, wherein the radial adjustment mechanism has mounting slots which extend from proximate a first surface of the radial adjustment mechanism to proximate a second surface of radial adjustment mechanism.

4. The modular mold clamp assembly as recited in claim 3, wherein three mounting slots, with the longitudinal axis of the three slots being positioned closer to each other at proximate the second surface, thereby allowing the radial adjustment mechanism to be mounted on the turntables of the molding machine.

5. The modular mold clamp assembly as recited in claim 3, wherein each mounting slot has a T-shaped configuration which cooperates with a respective mounting member to maintain the radial adjustment mechanism in position relative to the turntables.

6. The modular mold clamp assembly as recited in claim 3, wherein a center mounting slot is dimensioned to have tight tolerances to allow the center mounting slot to precisely align with a respective mounting member to proper align and secure the radial adjustment mechanism on the turntable.

7. The modular mold clamp assembly as recited in claim 1, wherein a cam follower mounting device is mounted on slide car of a first end member, the cam follower mounting device has a slot provide thereon which carriers a cam mounting block having a cam follower mounted thereon.

8. The modular mold clamp assembly as recited in claim 7, wherein the slot is dimensioned to allow the cam follower mounting device to freely move along a longitudinal axis of the slot, while preventing movement of the cam follower mounting device transverse to the longitudinal axis of the slot.

9. The modular mold clamp assembly as recited in claim 1, wherein the at least one support bracket is positioned proximate the center of gravity of the modular mold clamp assembly, such that approximately ½ the weight of the modular mold clamp assembly is distributed on either side of the at least one support bracket.

10. The modular mold clamp assembly as recited in claim 1, wherein the support bracket has a first adjustment mechanism which allows the modular clamp assembly to be adjusted toward and away from the center of the wheel of the molding machine.

11. A rotary molding machine comprising;
a pair of turntables rotatably mounted on one or more shafts;
a plurality of modular mold clamp assemblies mounted on and spaced around the turntable, each modular mold clamp assembly including a frame having a base member, a first end member and an opposed second end member, the first and second end members integrally attached to the base member;
radial adjustment mechanisms mounted on the first and second end members, the radial adjustment members cooperate with turntables;
at least one support bracket extending from each modular mold clamp assembly, the at least one support bracket cooperate with at least one support fixture of the rotary molding machine.

12. The rotary molding machine as recited in claim 11, wherein the radial adjustment mechanism has mounting slots which extend from proximate a first surface of the radial adjustment mechanism to proximate a second surface of radial adjustment mechanism.

13. The rotary molding machine as recited in claim 12, wherein each mounting slot has a T-shaped configuration which cooperates with a respective mounting member to maintain the radial adjustment mechanism in position relative to the turntables.

14. The rotary molding machine as recited in claim 12, wherein a center mounting slot is dimensioned to have tight tolerances to allow the center mounting slot to precisely align with a respective mounting member to proper align and secure the radial adjustment mechanism on the turntable.

15. The rotary molding machine as recited in claim 11, wherein a cam follower mounting device is mounted on slide car of a first end member, the cam follower mounting device has a slot provide thereon which carriers a cam mounting block having a cam follower mounted thereon.

16. The rotary molding machine as recited in claim 15, wherein the slot is dimensioned to allow the cam follower mounting device to freely move along a longitudinal axis of the slot, while preventing movement of the cam follower mounting device transverse to the longitudinal axis of the slot.

17. The rotary molding machine as recited in claim 11, wherein the at least one support bracket is positioned proximate the center of gravity of the modular mold clamp assembly, such that approximately ½ the weight of the modular mold clamp assembly is distributed on either side of the at least one support bracket.

18. The rotary molding machine as recited in claim 11, wherein the support bracket has a first adjustment mechanism and the support fixture has a second adjustment mechanism, the first and second adjustment mechanisms allow the modular clamp assembly to be adjusted toward and away from the shaft of the molding machine.

19. A method of adjusting a modular mold clamp assembly mounted on a rotary molding machine, the method comprising:
loosening mounting members to allow the mounting members to move relative to slots of a radial adjustment mechanisms attached to the modular mold clamp assembly;
engaging a first adjustment mechanism of a support bracket of the modular mold clamp to move the support bracket and the modular mold clamp assembly to a desired position relative to the a support fixture of the rotary molding machine and a shaft of the rotary molding machine; and
tightening the mounting members to prevent unwanted movement of the mounting members relative to the slots, thereby maintaining the modular mold clamp assembly in position relative to the rotary molding machine.

20. The method of claim 19, comprising:
monitoring the movement of the modular mold clamp assembly relative to a center of the rotary molding machine through the use of one or more gauges.

* * * * *